United States Patent
Liu et al.

(10) Patent No.: US 8,194,850 B2
(45) Date of Patent: Jun. 5, 2012

(54) METHOD AND APPARATUS FOR VOICE COMMUNICATION

(75) Inventors: Qing-Guang Liu, Sunnyvale, CA (US); Wilson Or, Belmont, CA (US)

(73) Assignees: Fortemedia, Inc., Sunnyvale, CA (US); Maxsonics, Inc., Santa Clara, CA (US)

( * ) Notice: Subject to any disclaimer, the term of this patent is extended or adjusted under 35 U.S.C. 154(b) by 1125 days.

(21) Appl. No.: 12/044,041

(22) Filed: Mar. 7, 2008

(65) Prior Publication Data

US 2008/0219434 A1  Sep. 11, 2008

Related U.S. Application Data

(60) Provisional application No. 60/905,964, filed on Mar. 9, 2007.

(51) Int. Cl.
*H04M 9/08* (2006.01)
(52) U.S. Cl. .................................. 379/406.05
(58) Field of Classification Search .............. 379/406.05
See application file for complete search history.

(56) References Cited

U.S. PATENT DOCUMENTS

| | | | |
|---|---|---|---|
| 2004/0057574 A1* | 3/2004 | Faller | 379/387.01 |
| 2004/0264686 A1 | 12/2004 | Enzner | |
| 2006/0147029 A1 | 7/2006 | Stokes, III et al. | |
| 2006/0206320 A1 | 9/2006 | Li | |
| 2008/0195382 A1* | 8/2008 | Krini et al. | 704/203 |

* cited by examiner

*Primary Examiner* — Alexander Jamal
(74) *Attorney, Agent, or Firm* — Thomas|Kayden

(57) ABSTRACT

A voice communication device with an integrated framework structure for echo cancellation and noise reduction is disclosed. A microphone receives a local input signal while a speaker is outputting a local output signal. The local input signal and output signal are all decomposed into a plurality of subband signals by filter banks for conducting individual processing of echo cancellation and noise reduction per subband. The subband echo canceller is followed by a DFT unit to split the cancellation result into a plurality of narrow frequency bins whereby the noise reduction is performed. The noise reduction results are recombined by an IDFT unit for residual echo removal in a subband non-linear processor. The final output is obtained from a synthesis filter bank that synthesizes the subband signals after echo cancellation and noise reduction into a full-band signal.

18 Claims, 5 Drawing Sheets

METHOD AND APPARATUS FOR VOICE COMMUNICATION

CROSS REFERENCE TO RELATED APPLICATIONS

This application claims the benefit of U.S. Provisional Application No. 60/905,964, filed Mar. 9, 2007.

BACKGROUND OF THE INVENTION

1. Field of the Invention

The invention relates to voice communication, and in particular, to an integrated digital processing framework structure simultaneously performing noise reduction and echo cancellation in an efficient way.

2. Description of the Related Art

Acoustic echo cancellation and noise reduction are two prominent voice signal processing units in hands-free voice communications devices such as mobile phones, speakerphones and voice intercom systems. In these applications, an echo canceller is used to prevent the system from going into howling caused by the acoustic feedback of the far-end speech signal via the speaker-to-microphone coupling loop, and to reduce the unpleasant perceived echo return to the far-end talker. The noise suppresser, on the other hand, is used to reduce the additive ambient noise picked up by the microphone to improve the quality and intelligibility of the speech.

Even though the echo and noise reduction problems are typically tackled using different technologies, the combined treatment has attracted a lot of interests. A survey on the combined treatment was given by Jeannes et al., in "Combined Noise and Echo Reduction in Hands-Free Systems: A survey", *IEEE Trans. On Speech and Audio Processing*, vol. 9, no. 8, November 2001, pp. 808-820. An earlier review on the technologies was presented by Martin et al., in "Combined Acoustic Echo Control and Noise Reduction for Hands-Free Telephony—States of the Art and Perspectives", *Proceedings of EUSIPCO*, 1996, pp. 1107-1110.

An integrated scheme for echo cancellation and noise reduction can show advantages over a simple cascading of two. Such an example is given by Rombouts et al., in "An Integrated Approach to Acoustic Echo and Noise Cancellation"; *Signal Processing*, vol. 85, issue 4, April 2005, pp. 849-871. In addition, more advantages in computational resource usage savings exist if some of the computational units utilized in both echo cancellation and noise reduction algorithms can be shared in the integrated solution. Such a case can be found by combining a subband based echo canceller with a general noise reduction algorithm.

An echo canceller based on subband structure is widely recognized in the art because of lower computational complexity and faster convergence compared to a full-band filter structure (see *Advances in Network and Acoustic Echo Cancellation*, by Benesty et al., Springer, 2001). In a subband echo canceller, the microphone and the received-in signals are respectively decomposed into subband signals by an analysis filter bank and adaptive filtering will be performed in each of the subbands. For typical noise reduction algorithms, the microphone signal also needs to be spilt into different frequency bands (see Chapter 11 in *Digital Speech Transmission, Enhancement, Coding and Error Concealment*, by Vary et al., John Wiley & Sons, Ltd., England, 2006). Therefore, if the subband echo canceller and noise suppression are implemented in the same subband domain, the redundancy of using two separate analysis filter banks will be eliminated. One approach based on this idea is proposed by Sasaki et al., in "Noise Reduction for Subband Acoustic Echo Canceller", *Proceedings of Acoustic Society of America and Acoustic Society of Japan Third Joint Meeting*, December 1996, pp. 1285-1290, wherein both the echo cancellation and noise reduction are executed in a single set of 32 subbands. An approach of sharing the same subband for echo and noise reduction is also disclosed by Oh, *Subband Acoustic Noise Suppression*, U.S. Pat. No. 5,933,495, where a number of eight subbands are preferred to be used.

The method of implementing both the acoustic echo cancellation and the noise reduction in subband as described above in prior arts can be illustrated in FIG. 1. A microphone 102 receives a local input signal $\#L_{in}$ while the speaker 104 is outputting a local output signal $\#L_{out}$. Local talker voice signal, together with the acoustic echo of the local output signal $\#L_{out}$ and the ambient noise signals are all picked up by the microphone 102 as the local input signal $\#L_{in}$. Thus, noise reduction and echo cancellation are both required. In FIG. 1, a first filter bank 112 and a second filter bank 114 provide a conventional structure to analyze the full band input signals respectively into frequency bands for echo cancellation and noise reduction. The first filter bank 112 performs a subband decomposition on the local output signal $\#L_{out}$ to generate a plurality of first subband signals $X_j$ (j=1 to N) each corresponding to the signal residing in the respective subband, and likewise the second filter bank 114 decomposes the local input signal $\#L_{in}$ to generate the same plurality of second subband signal $Y_j$ in the set of corresponding subbands. A plurality of echo cancellers 118 are provided, each performing echo cancellation on a pair of first subband signal $X_j$ and second subband signal $Y_j$ to output a cancellation result $E_j$. Each cancellation results $E_j$ is respectively sent to its own noise reduction unit 212 in which noise reduction are processed. A plurality of noise reduction units 212 exist. Each noise reduction results $R_j$ is respectively then sent to nonlinear processors 130 for further residual echo suppressions. A plurality of nonlinear processors 130 exist. A synthesis filter bank 116 is coupled to the nonlinear processors 130, synthesizing from all the output results $D_j$ from the nonlinear processors 130 into the full-band outbound signal $\#R_{out}$.

FIG. 2 is a flowchart of the conventional method for implementing echo cancellation and noise reduction in subband based on FIG. 1. In step 201, the first filter bank 112 and second filter bank 114 convert the local input signal $\#L_{in}$ and local output signal $\#L_{out}$ into first subband signals $X_j$ and second subband signals $Y_j$, wherein further procedures are processed per subband. In step 203, an echo canceller 118 performs echo cancellation on a second subband signal $Y_j$ based on a first subband signal $X_j$ to generate a cancellation result $E_j$. In step 205, a noise reduction unit 212 performs noise reduction on the cancellation result $E_j$ to generate a de-noised result $R_j$. In step 207, a nonlinear processor 130 performs residual echo suppression on the de-noised result $R_j$ to generate a qualified result $D_j$. In step 209, all the qualified results $D_j$ from every subband are synthesized by a synthesis filter bank 116 to render an outbound signal $\#R_{out}$.

In the integrated structure as shown in FIG. 1, although noise reduction is implemented in conjunction with echo cancellation per subband, its performance may not be achieved at an optimized level due to the fact that the requirements for frequency band partitioning are generally different for optimal echo cancellation and for optimal noise reduction algorithms. For echo cancellation in the subband domain, smaller number of subbands such as 8, 16, or 32 are typically used. If the number of subbands is larger than 32, the processing delay and the implementation complexity will become too high as revealed in many literatures and disclosures (e.g., U.S. Pat. No. 5,305,307 and No. 5,566,167). But for noise reduction, larger number of subbands such as 128 or 256 are needed in order to obtain satisfactory results when applying commonly used noise suppression algorithms such as the spectral subtraction and Minimum Mean Square Error (MMSE).

Therefore, performing the noise reduction in the exact same frequency subbands as echo cancellation, as shown in FIG. 1, lead to performance compromises for either the echo cancellation, or for the noise reduction, or both, due to their contradicting requirements on the frequency band separation.

BRIEF SUMMARY OF THE INVENTION

An exemplary embodiment of a voice communication device with integrated echo cancellation and noise reduction is disclosed. A microphone receives a local input signal while a speaker is outputting the received far-end signal as a local output signal, wherein the local input signal comprises local talker voice signal together with the ambient noises and the acoustic echo of the local output signal. A first filter bank and a second filter bank perform subband decompositions on the local input and output signals to generate a plurality of first and second subband signals each corresponding to a subband. A plurality of processing units perform noise reduction and echo cancellation for each pair of first and second subband signals to generate qualified results. A synthesis filter bank 116 synthesizes the qualified results to generate an outbound signal in which echo signals are cancelled and noise signals are suppressed. Each of the processing units undergoes a short-term Discrete Fourier Transform (DFT) analysis further on subband before performing noise reduction, whereby in the process each subband is decomposed by the DFT analysis into a plurality of narrow frequency bins, and noise reduction is performed per each frequency bin.

In each processing unit, an echo canceller performs echo cancellation on a pair of first and second subband signals to generate a cancellation result. A DFT unit decomposes the cancellation result into a plurality of transformed signals each corresponding to a narrow frequency bin. A plurality of noise suppressors each performs noise suppression on its input of DFT-transformed signals to generate a plurality of suppression results. An inverse Discrete Fourier Transform (IDFT) unit reassembles the suppression results into a de-noised signal back into subband. A nonlinear processor suppresses residual echo in the de-noised result to generate a qualified result as an input to the synthesis filter bank.

The echo canceller comprises an adaptive filter and a subtractor. The adaptive filter renders a simulated echo signal from the first subband signal, and the subtractor subtracts this simulated echo signal from the second subband signal to generate the cancellation result. The adaptive filter has its coefficients updated using a Normalized Least Mean Square (NLMS) algorithm so that it could learn the impulse response of the echo path and then generate the echo signal estimate.

The subband decomposition generates eight, sixteen or thirty-two subbands, and the short-term DFT analysis done by DFT units further decomposes a subband into sixteen or thirty-two narrow frequency bins.

On each consecutive M/2 samples output from the echo canceller, the DFT unit 310 generates a plurality of transformed signals according to a DFT formula:

$$T_i(t) = \sum_{k=0}^{M-1} e^{\frac{-2\pi \cdot i \cdot k}{M}} w_k \cdot E_j(t-k)$$

$$i = 1 \ldots M,$$

where $T_i(t)$ is the $i^{th}$ transformed signal corresponding to a time index t, $E_j(t-k)$ is the output sample from the echo canceller corresponding to the $j^{th}$ subband and a time index (t−k), and $w_k$ is a member of weight factors.

Each noise suppressor may perform noise suppression on a corresponding transformed signal $T_i(t)$ using a spectral subtraction algorithm or a Minimum Mean Square Error (MMSE) algorithm, thereby generating a plurality of suppression results $F_i(t)$ corresponding to the transformed signals. The IDFT unit reassembles the suppression results into a plurality of preliminary results according to the formula:

$$N_k(t) = \frac{1}{M} \sum_{i=0}^{M-1} e^{\frac{2\pi \cdot i \cdot k}{M}} F_i(t)$$

$$k = 1 \ldots M,$$

where $N_k(t)$ is the preliminary result at a time index t, and $F_i(t)$ is the $i^{th}$ suppression result corresponding to the $i^{th}$ transformed signal. Thereafter, the IDFT unit performs an overlap-add operation by adding the first M/2 samples of the current preliminary results to the last M/2 samples of the previous preliminary results to generate the de-noised results.

An embodiment of the voice communication method implemented on the described voice communication device is disclosed. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3b shows an embodiment of a processing unit 350 based on FIG. 3a; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
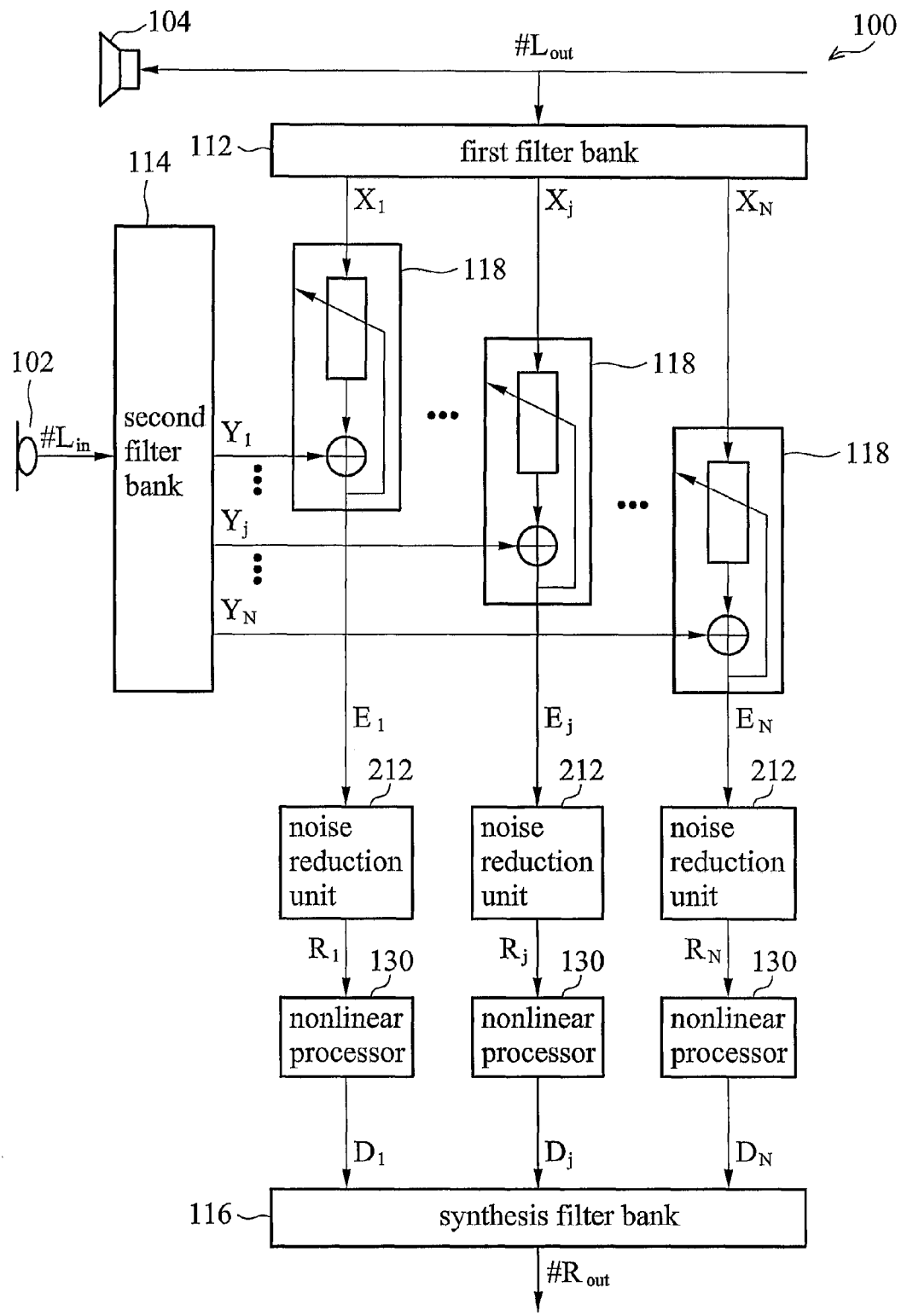
FIG. 1 shows a voice communication device 100 using a conventional framework structure of echo cancellation and noise reduction in a prior art.
Figure 2:
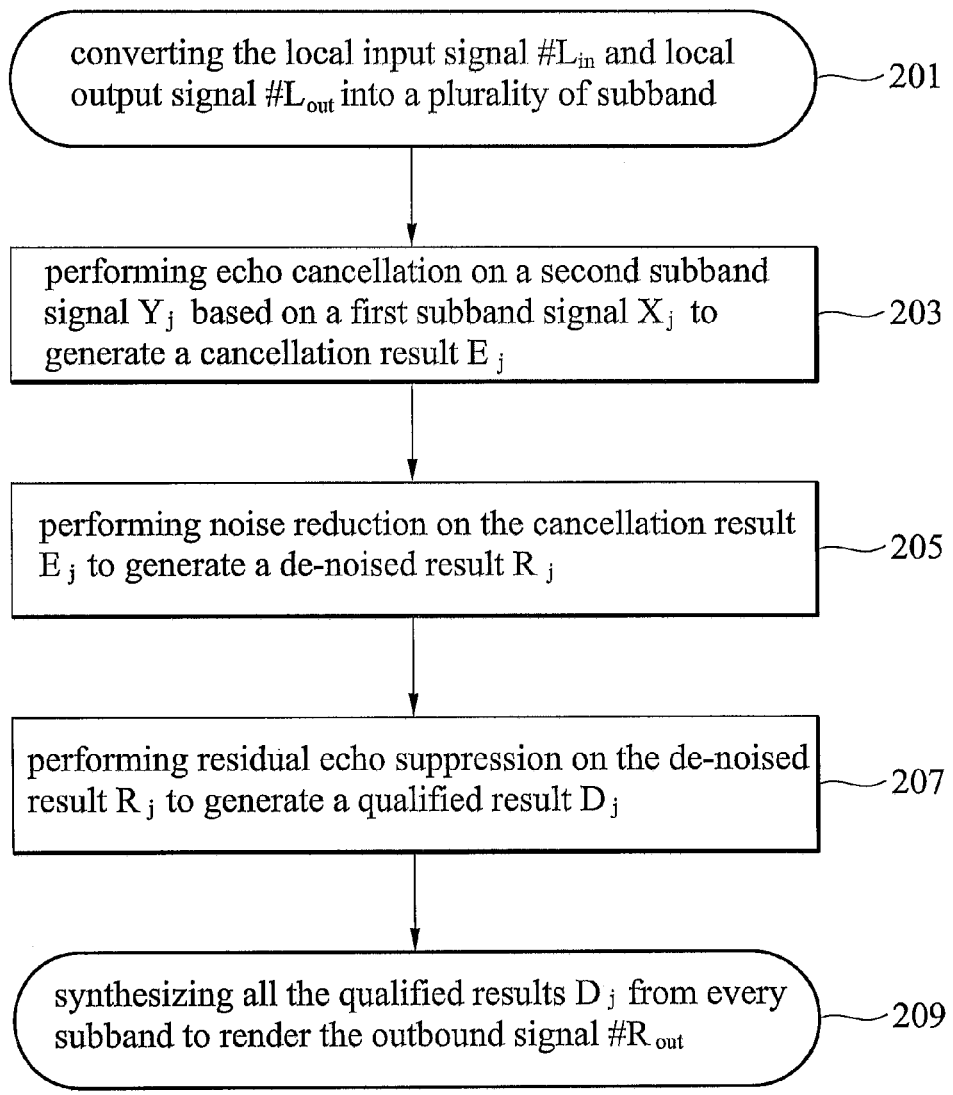
FIG. 2 is a flowchart of the conventional echo cancellation and noise reduction method in a prior art based on FIG. 1.
Figure 3A:
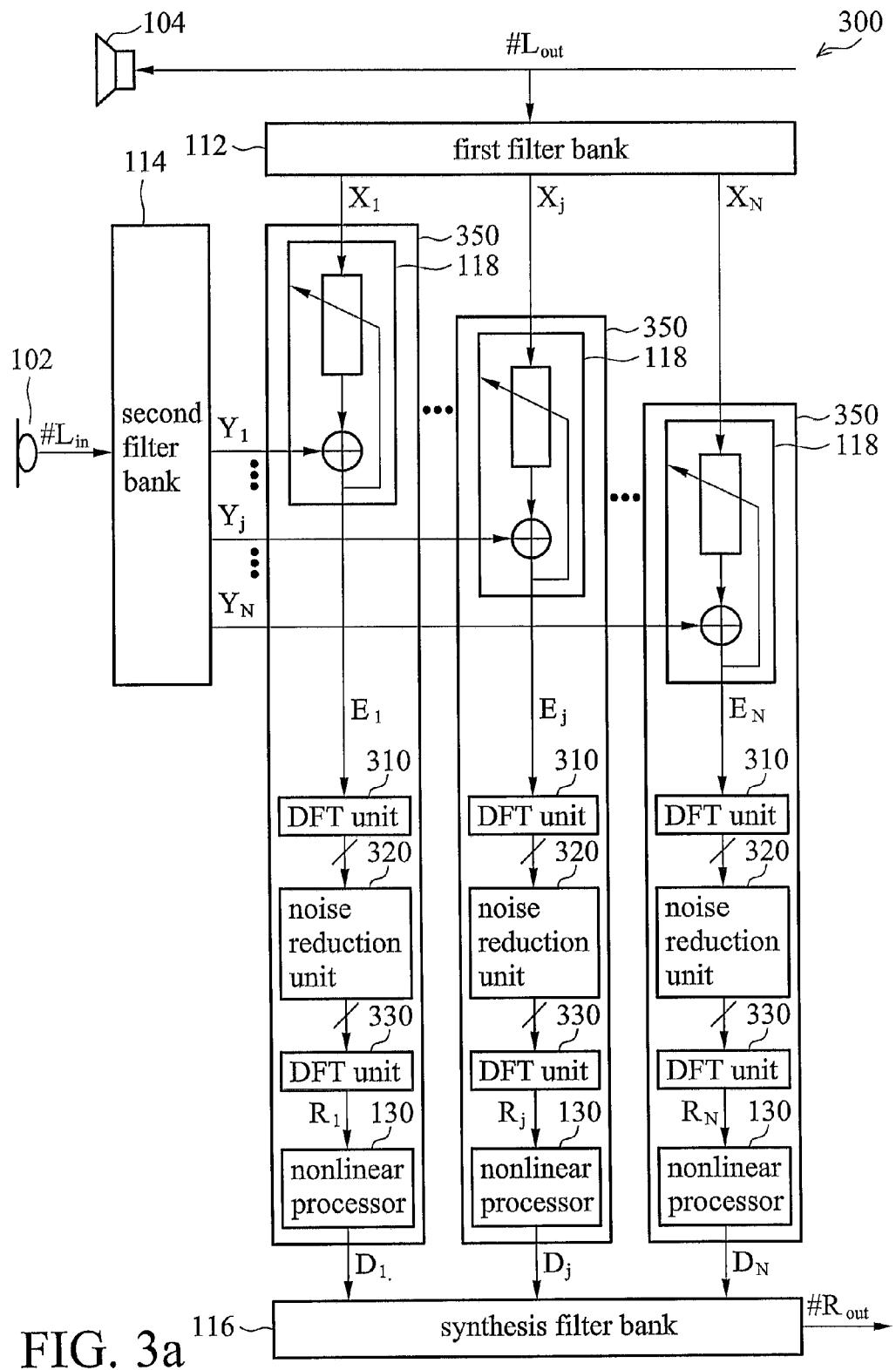
FIG. 3a shows an embodiment of a voice communication device 300 using the integrated framework structure for echo cancellation and noise reduction according to the invention.

FIG. 3a shows an embodiment of a voice communication device 300 according to the invention. In the embodiment, a set of Discrete Fourier Transform (DFT) units 310, noise reduction units 320 and Inverse Discrete Fourier Transform (IDFT) unit 330 are provided in substitute for noise reduction units 212 in FIG. 1. As known, a microphone 102 receives a local input signal #L$_{in}$ while a speaker 104 is outputting a local output signal #L$_{out}$, and the local input signal #L$_{in}$ is contaminated additively by the ambient noises and also by the acoustically coupled echo of the local output signal #L$_{out}$. The first filter bank 112 and second filter bank 114 decomposes the local input signal #L$_{in}$ and local output signal #L$_{out}$ into a plurality of subbands, and a plurality of processing units 350 are provided to further process the first subband signal X$_j$ and second subband signal Y$_j$ in each subband. The qualified results D$_j$ output from the processing units 350 are synthesized in a synthesis filter bank 116 to generate an outbound signal #R$_{out}$ in which echo and noise signals are cancelled and suppressed respectively.

A short-term DFT analysis is further applied to each subband with in the processing unit 350 before performing noise reduction. After the short-term DFT analysis, each subband is decomposed into a plurality of narrow frequency bins, and noise reduction is performed per narrow frequency bin.

Figure 3B:
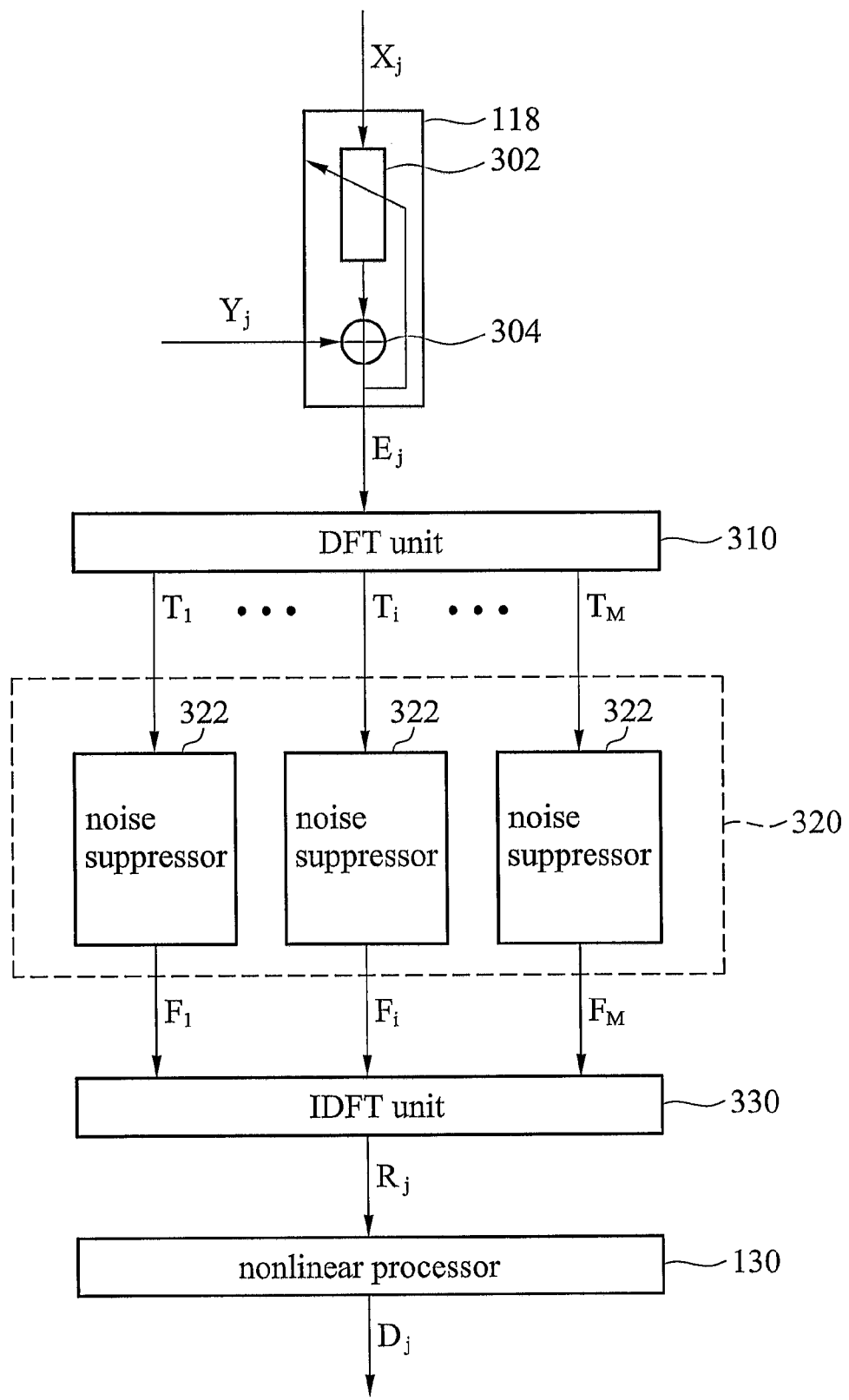

FIG. 3b shows an embodiment of a processing unit 350 based on FIG. 3a. In the processing unit 350, an echo canceller 118 performs echo cancellation on a pair of first subband signal X$_j$ and second subband signal Y$_j$ to generate a cancellation result E$_j$. A DFT unit 310 performs short-term DFT analysis to decompose the cancellation result E$_j$ into a plurality of transformed signals T$_i$ (i=1 to M) each corresponding to a narrow frequency bin. Each noise reduction unit 320 comprises a plurality of noise suppressors 322 operated in a narrow frequency bin. The transformed signals T$_i$ are individually sent to corresponding noise suppressors 322, whereby noise in the transformed signals T$_i$ are suppressed to generate a plurality of suppression results F$_i$. An IDFT unit 330 is coupled to the outputs of noise suppressors 322, performing short-term IDFT synthesis to reassemble the suppression results F$_i$ into a de-noised result R$_j$. A nonlinear processor 130 is coupled to the IDFT unit 330, suppressing residual echo in the de-noised result R$_j$ to generate a qualified result D$_j$.

The echo canceller 118 may comprise an adaptive filter 302 and a subtractor 304. The adaptive filter 302 renders a simulated echo signal from the first subband signal X$_j$, and the subtractor 304 subtracts this simulated echo signal from the second subband signal Y$_j$ to generate the cancellation result E$_j$. Specifically, the adaptive filter 302 may be an adaptive filter with coefficients updated using a Normalized Least Mean Square (NLMS) algorithm. The cancellation result E$_j$ may contain a certain amount of residual echo and ambient noise signal.

In the embodiment, the first filter bank 112 and second filter bank 114 may decompose the input signals into 8, 16 or 32 subbands, the same number of processing units 350 are required accordingly. In each of the processing units 350, a DFT unit 310 further decomposes a cancellation result E$_j$ into 16 or 32 narrow frequency bins by performing a short-term DFT analysis on the cancellation result E$_j$, and accordingly, the same number of noise suppressors 322 is implemented in each noise reduction unit 320.

The echo cancellation result E$_j$ may be grouped into a frame of M samples for every M/2 new samples output from the echo canceller 118. The current frame of M samples is half-overlapped with the previous one. In other words, the first M/2 samples of the current frame are identical to the last M/2 samples of the previous frame. The short-term DFT analysis is obtained by applying a M-point DFT on one frame of such grouped samples.

The DFT unit 310 generates a plurality of transformed signals T$_i$ from a frame of M samples of the cancellation result E$_j$ according to a DFT formula:

$$T_i(t) = \sum_{k=0}^{M-1} e^{\frac{-2\pi \cdot i \cdot k}{M}} w_k \cdot E_j(t-k)$$

$$i = 1 \ldots M,$$

where T$_i$(t) is the i$^{th}$ transformed signal corresponding to a time index t, E$_j$(t−k) is the k$^{th}$ element in the j$^{th}$ subband output from the echo canceller 118, and w$_k$ is the k$^{th}$ element in a set of weight factors.

In noise reduction units 320, each noise suppressor 322 performs noise suppression on a corresponding transformed signal T$_i$ using a spectral subtraction algorithm or a MMSE algorithm, thereby a plurality of suppression results F$_i$ corresponding to the transformed signals T$_i$ are generated. The IDFT unit 330 then reassembles the suppression results F$_i$ (i=1 to M) and produce a noise-suppressed signal R$_j$ at the j$^{th}$ subband by performing a short-term IDFT synthesis. To do so, a plurality of preliminary results N$_k$ is generated first according to the IDFT formula:

$$N_k(t) = \frac{1}{M} \sum_{k=0}^{M-1} e^{\frac{2\pi \cdot i \cdot k}{M}} F_i(t)$$

$$k = 1 \ldots M,$$

where N$_k$(t) is the k$^{th}$ component of the IDFT result at a time index t, and F$_i$(t) is the i$^{th}$ suppression result corresponding to the i$^{th}$ transformed signal T$_i$. Given a frame of N$_k$(t) (k=1, . . . , M) calculated as above, a frame of M/2 de-noised signal R$_j$ is then obtained by adding the first M/2 elements of the current N$_k$(t) frame with the last M/2 elements of the previous N$_k$(t) frame.

Note that the residual echo component contained in the cancellation result E$_j$ is not part of the additive noise to the microphone 102 and therefore cannot be suppressed by noise suppressors 322. The de-noised result R$_j$ output from the IDFT unit 330 may still contain the residual echo component, thus the nonlinear processor 130 is used to suppress the residual echo. A nonlinear processor 130 may use a center clipping algorithm or other known arts; detailed description is omitted herein.

Figure 4:
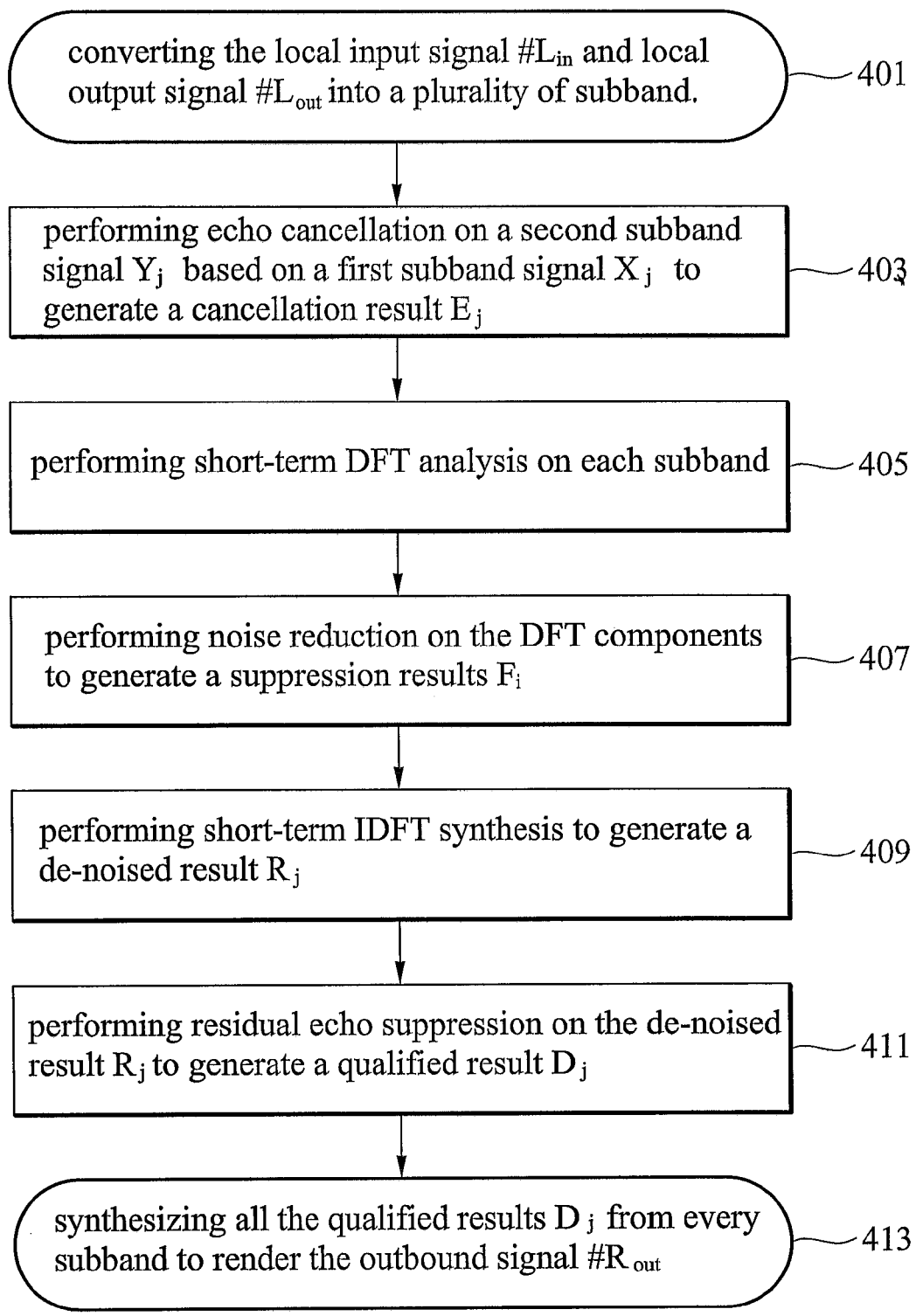
FIG. 4 is a flowchart of an integrated echo cancellation and noise reduction method according to the invention.

FIG. 4 is a flowchart of an integrated echo cancellation and noise reduction method according to the invention. The described embodiment can be summarized into the following steps. In step 401, a subband decomposition is performed, whereby the local input signal #L$_{in}$ and local output signal #L$_{out}$ are decomposed into a plurality of subbands, and echo cancellation and noise reduction are performed per subband. In step 403, echo cancellation is individually performed for each pair of first subband signals X$_j$ and second subband signals Y$_j$ to generate a corresponding cancellation result E$_j$. In step 405, a short-term DFT analysis is performed on the cancellation result E$_j$, whereby the subband is decomposed into a plurality of narrow frequency bins. In step 407, noise reduction processes are performed per narrow frequency bin to generate a plurality of suppression results F$_i$. In step 409, these suppression results F$_i$ are reassembled by performing IDFT synthesis to generate a de-noised result R$_j$ back in the subband domain. In step 411, the de-noised result R$_j$ is sent to a nonlinear processor 130 for residual echo suppression, and thus a qualified result $D_j$ is output. In step 413, the synthesis filter bank 116 recombines all the qualified results $D_j$ output from the processing units 350 to generate the outbound signal #$R_{out}$.

One advantage of the invention is that it provides a framework structure for integrating echo cancellation and noise reduction into a single digital signal processing unit with out compromising the performance of either the echo cancellation, or the noise reduction, or both. Another advantage of the invention is that the integrated framework structure offers improved management of processing elements such that simultaneous echo cancellation and noise reduction can be executed with improved resource usage efficiencies.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voice communication device, comprising:
   a speaker for outputting a local output signal;
   a microphone, receiving a local input signal while the speaker is outputting the local output signal, wherein the local input signal comprises ambient noise and echo of the local output signal;
   a first filter bank, performing a subband decomposition on the local output signal to generate a plurality of first subband signals each corresponding to a subband;
   a second filter bank, coupled to the microphone, performing the same subband decomposition on the local input signal to generate a plurality of second subband signals each corresponding to a subband;
   a plurality of processing units each corresponding to a subband, coupled to the first and second filter banks to perform noise reduction and echo cancellation based on each pair of first and second subband signal inputs; and
   a synthesis filter bank, coupled to the processing units, synthesizing the qualified results output from the processing units to generate an outbound signal in which echoes are cancelled and noises are suppressed,
   wherein each of the processing units performs a short-term DFT analysis on the subbands before performing noise reduction, and wherein each subband is decomposed into a plurality of narrow frequency bins, and noise reduction is performed per narrow frequency bin, each processing unit comprises:
   an echo canceller, performing echo cancellation based on a pair of first and second subband signal input to generate a cancellation result;
   a Discrete Fourier Transform (DFT) unit, performing short-term DFT analysis to decompose the cancellation result into a plurality of transformed signals each corresponding to a narrow frequency bin;
   a plurality of noise suppressors coupled to the DFT unit, each corresponding to a narrow frequency bin, performing noise suppression on the transformed signals to generate a plurality of noise suppression results;
   an Inverse Discrete Fourier Transform (IDFT) unit, coupled to noise suppressors, performing short-term IDFT synthesis to reassemble the suppression results into a de-noised result; and
   a nonlinear processor, coupled to the IDFT unit, suppressing residual echo in the de-noised result to generate a qualified result as an input to the synthesis filter bank, and wherein the results from each echo canceller are grouped into a frame of M samples per frame time, in which the first M/2 samples of the current frame are identical to the last M/2 samples of the previous frame.

2. The voice communication device as claimed in claim 1, wherein the echo canceller comprises:
   a filter, rendering a simulated echo signal from the first subband signal; and
   a subtractor, subtracting the simulated echo signal from the second subband signal to generate the cancellation result.

3. The voice communication device as claimed in claim 2, wherein the filter is an adaptive filter with coefficients updated using a Normalized Least Mean Square (NLMS) algorithm.

4. The voice communication device as claimed in claim 2, wherein:
   the subband decomposition generates eight, sixteen or thirty-two subbands; and
   the short-term DFT analysis decomposes a subband into sixteen or thirty-two narrow frequency bins.

5. The voice communication device as claimed in claim 1, wherein the DFT unit generates a plurality of transformed signals from the M samples in the cancellation result according to a DFT formula:

$$T_i(t) = \sum_{k=0}^{M-1} e^{\frac{-2\pi \cdot i \cdot k}{M}} w_k \cdot E_j(t-k)$$

$$i = 1 \ldots M,$$

where $T_i(t)$ is the $i^{th}$ transformed signal corresponding to a time index t, $E_j(t-k)$ is the output sample from the echo canceller corresponding to the $j^{th}$ subband and a time index (t−k), and $w_k$ is a member of weight factors.

6. The voice communication device as claimed in claim 5, wherein each noise suppressor performs noise suppression on a corresponding transformed signal using a spectral subtraction algorithm or a Minimum Mean Square Error (MMSE) algorithm, thereby generating a plurality of suppression results corresponding to the transformed signals.

7. The voice communication device as claimed in claim 6, wherein the IDFT unit reassembles the suppression results into a plurality of preliminary results according to the formula:

$$N_k(t) = \frac{1}{M} \sum_{i=0}^{M-1} e^{\frac{2\pi \cdot i \cdot k}{M}} F_i(t)$$

$$k = 1 \ldots M,$$

where $N_k(t)$ is the $k^{th}$ component of the preliminary result at a time index t, and $F_i(t)$ is the $i^{th}$ suppression result corresponding to the $i^{th}$ transformed signal.

8. The voice communication device as claimed in claim 7, wherein the IDFT unit adds the first M/2 samples of the current preliminary result with the last M/2 samples of the previous preliminary result to generate the de-noised result.

9. A voice communication method, comprising:
   receiving a local input signal while outputting a local output signal, wherein the local input signal comprises ambient noise and echo of the local output signal;

performing a subband decomposition on the local output signal to generate a plurality of first subband signals each corresponding to a subband;

performing the same subband decomposition on the local input signal to generate a plurality of second subband signals each corresponding to a subband;

individually performing echo cancellation processes based on each pair of first subband signals and second subband signals to generate corresponding cancellation results;

performing a short-term DFT analysis on the cancellation results, whereby each subband is decomposed into a plurality of narrow frequency bins;

individually performing noise reduction processes per narrow frequency bin to generate a plurality of de-noised results; and synthesizing the de-noised results to generate an outbound signal in which echo and noise signals are cancelled or suppressed, wherein the cancellation results are grouped into a frame of M samples per frame time, in which the first M/2 samples of the current frame are identical to the last M/2 samples of the previous frame.

10. The voice communication method as claimed in claim 9, wherein each noise reduction process is performed on a corresponding cancellation result, comprising:

performing short-term DFT analysis to decompose the cancellation result into a plurality of transformed signals each corresponding to a narrow frequency bin;

performing noise suppression on the transformed signals to generate a plurality of suppression results;

performing short-term IDFT synthesis to reassemble the suppression results into a de-noised result.

11. The voice communication method as claimed in claim 10, further comprising, suppressing residual echoes in the de-noised results before synthesizing the de-noised results into the outbound signal.

12. The voice communication method as claimed in claim 9, wherein each echo cancellation process comprises:

rendering a simulated echo signal from a first subband signal; and subtracting the simulated echo signal from a second subband signal to generate a current cancellation result.

13. The voice communication method as claimed in claim 12, wherein the echo cancellation process is an adaptive filtering process with coefficients updated using a Normalized Least Mean Square (NLMS) algorithm.

14. The voice communication method as claimed in claim 12, wherein:

the subband decomposition divides the local input and output signals into eight, sixteen or thirty-two subbands; and the short-term DFT analysis decomposes a subband into sixteen or thirty-two narrow frequency bins.

15. The voice communication method as claimed in claim 9, wherein the DFT process comprises, generating a plurality of transformed signals from the M samples in the cancellation result according to a DFT formula:

$$T_i(t) = \sum_{k=0}^{M-1} e^{\frac{-2\pi \cdot i \cdot k}{M}} w_k \cdot E_j(t-k)$$

$$i = 1 \ldots M,$$

where $T_i(t)$ is the $i^{th}$ transformed signal corresponding to a time index t, $E_j(t-k)$ is the output sample from the echo canceller corresponding to the $j^{th}$ subband and a time index (t−k), and $w_k$ is a member of weight factors.

16. The voice communication method as claimed in claim 15, wherein each noise reduction process comprises, performing noise suppression on a corresponding transformed signal using a spectral subtraction algorithm or a MMSE algorithm, thereby generating a plurality of suppression results corresponding to the transformed signals.

17. The voice communication method as claimed in claim 16, wherein each IDFT process comprises, reassembling the suppression results into a plurality of preliminary results according to the formula:

$$N_k(t) = \frac{1}{M} \sum_{i=0}^{M-1} e^{\frac{2\pi \cdot i \cdot k}{M}} F_i(t)$$

$$k = 1 \ldots M,$$

where $N_k(t)$ is the $k^{th}$ component of the preliminary result at a time index t, and $F_i(t)$ is the $i^{th}$ suppression result corresponding to the $i^{th}$ transformed signal.

18. The voice communication method as claimed in claim 17, wherein each IDFT process further comprises, adding the first M/2 samples of a current preliminary result with the last M/2 samples of a previous preliminary result to generate the de-noised result.

* * * * *